(12) United States Patent
Warner et al.

(10) Patent No.: US 12,645,552 B2
(45) Date of Patent: Jun. 2, 2026

(54) FAILURE FAULT TOLERANCE IN DISTRIBUTED MEMORY SYSTEMS

(71) Applicant: Micron Technology, Inc., Boise, ID (US)

(72) Inventors: Craig William Warner, Coppell, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 18/750,144

(22) Filed: Jun. 21, 2024

(65) Prior Publication Data

US 2025/0077369 A1 Mar. 6, 2025

Related U.S. Application Data

(60) Provisional application No. 63/534,967, filed on Aug. 28, 2023.

(51) Int. Cl.
*G06F 11/20* (2006.01)
*G06F 11/16* (2006.01)

(52) U.S. Cl.
CPC ...... *G06F 11/2056* (2013.01); *G06F 11/1658* (2013.01)

(58) Field of Classification Search
CPC ............. G06F 11/0727; G06F 11/1658; G06F 11/1666; G06F 11/2007; G06F 11/2052; G06F 11/2053; G06F 11/2056
See application file for complete search history.

(56) References Cited

U.S. PATENT DOCUMENTS

| | | | | |
|---|---|---|---|---|
| 9,645,872 | B1 * | 5/2017 | Ravindranath | G06F 11/14 |
| 2015/0242124 | A1 * | 8/2015 | Law | G06F 3/0659 711/103 |
| 2019/0377650 | A1 * | 12/2019 | Nguyen | G06F 3/0619 |
| 2022/0350767 | A1 * | 11/2022 | McGraw | G06F 11/2007 |
| 2023/0176749 | A1 * | 6/2023 | Hily | G06F 11/1048 711/154 |

OTHER PUBLICATIONS

Kennedy, Patrick, "Compute Express Link CXL 3.0 is the Exciting Building Block for Disaggregation", [Online]. Retrieved from the Internet: https: www.servethehome.com compute-express-link-cxl-3-0-is-the-exciting-building-block-for-disaggregation , (Aug. 4, 2022), 8 pages.

* cited by examiner

*Primary Examiner* — Michael Maskulinski
(74) *Attorney, Agent, or Firm* — Schwegman Lundberg & Woessner, P.A.

(57) ABSTRACT

Disclosed in some examples are methods, systems, devices, and architectures which provide for techniques for memory device and memory fabric redundancy within distributed memory systems. In some examples, two memory devices are paired and each stores a same set of data such that writes to the memory devices are duplicated and reads may be satisfied from either device. In some examples, a memory processing unit (MPU) may be incorporated into the memory architecture to support these paired memory devices. The MPU may be placed between the host and a multi-planed memory fabric which connects to multi-ported CXL memory devices. In some examples, the MPU may also enable the use of alternative fabric links. That is, if a memory fabric link between the MPU and a memory device is unavailable, an alternative link may be utilized to restore connectivity to a memory device.

17 Claims, 11 Drawing Sheets

FAILURE FAULT TOLERANCE IN DISTRIBUTED MEMORY SYSTEMS

GOVERNMENT RIGHTS

This invention was made with United States Government support under Contract Number DE-AC05-76RL01830 for the Pacific Northwest National Laboratory. The United States Government has certain rights in this invention.

TECHNICAL FIELD

Embodiments pertain to failure fault tolerance in distributed memory architectures. Some embodiments relate to use of redundant memory devices in distributed memory architectures. Some embodiments relate to use of redundant fabric in distributed memory architectures.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magneto-resistive random-access memory (MRAM), among others. Persistent memory is an architectural property of the system where the data stored in the media is available after system reset or power-cycling. In some examples, non-volatile memory media may be used to build a system with a persistent memory model.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

Various protocols or standards can be applied to facilitate communication between a host and one or more other devices such as memory buffers, accelerators, or other input/output devices. In an example, a protocol such as Compute Express Link (CXL) can be used to provide high-bandwidth and low-latency connectivity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
FIG. 1 illustrates a schematic diagram of a system topology with availability improving hardware according to some examples of the present disclosure.
Figure 1:
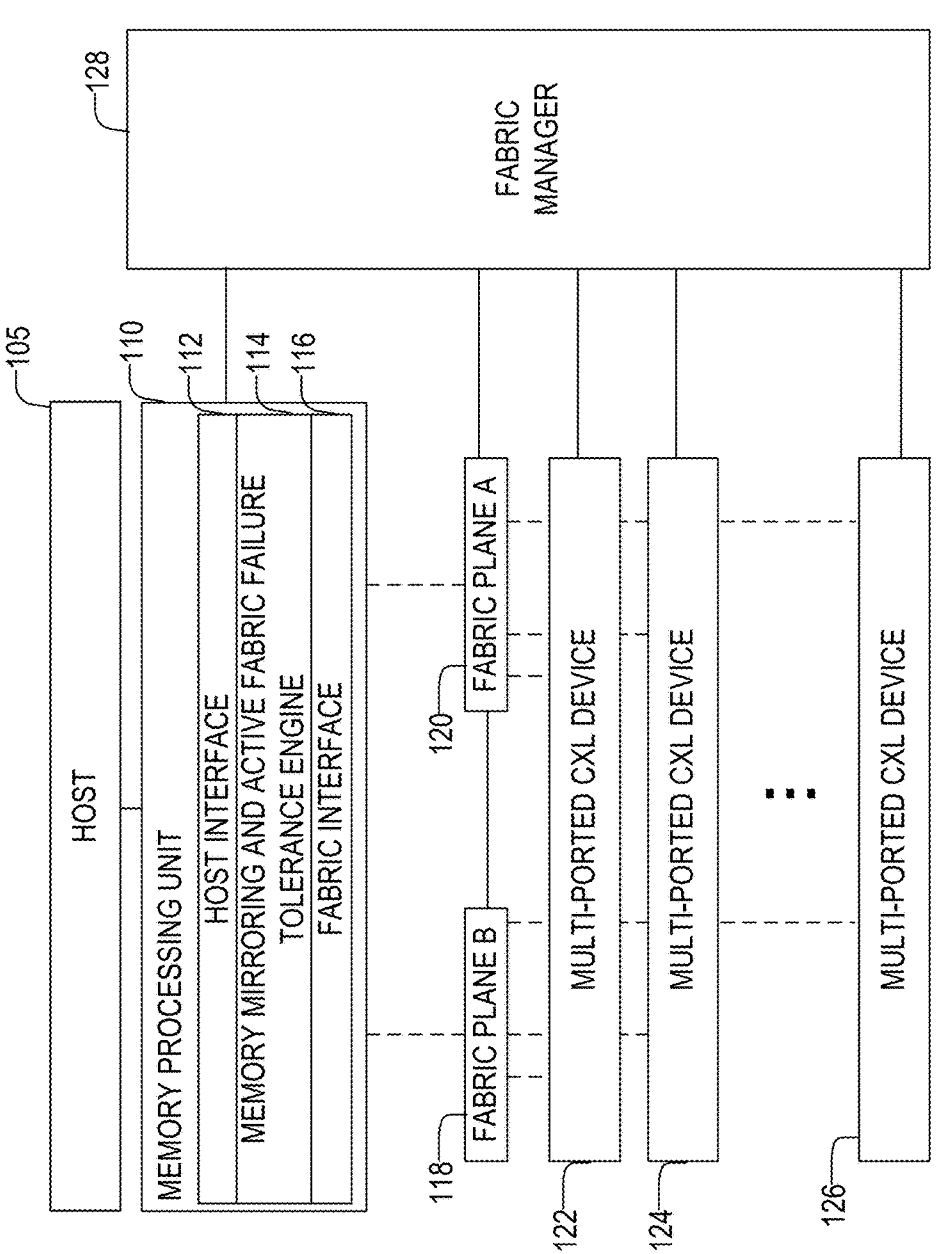

Compute Express Link (CXL) is an open standard interconnect configured for high-bandwidth, low-latency connectivity between host devices and other devices such as accelerators, memory devices, and smart I/O devices. CXL was designed to facilitate high-performance computational workloads by supporting heterogeneous processing and memory systems. CXL enables coherency and memory semantics on top of PCI Express (PCIe)-based I/O semantics for optimized performance.

In some examples, CXL is used in applications such as artificial intelligence, machine learning, analytics, cloud infrastructure, edge computing devices, communication systems, and elsewhere. Data processing in such applications can use various scalar, vector, matrix and spatial architectures that can be deployed in CPU, GPU, FPGA, smart NICs, and other accelerators that can be coupled using a CXL link.

CXL supports dynamic multiplexing using a set of protocols that includes input/output (CXL.io, based on PCIe), caching (CXL.cache), and memory (CXL.memory) semantics. In an example, CXL can be used to maintain a unified, coherent memory space between the CPU (e.g., a host device or host processor) and any memory on an attached CXL device. This configuration allows the CPU and other devices to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL runs on PCIe PHY and provides full interoperability with PCIe. In an example, a CXL device starts link training in a PCIe Gen 1 Data Rate and negotiates CXL as its operating protocol (e.g., using the alternate protocol negotiation mechanism defined in the PCIe 5.0 specification) if its link partner is capable of supporting CXL. Devices and platforms can thus more readily adopt CXL by leveraging the PCIe infrastructure and without having to design and validate the PHY, channel, channel extension devices, or other upper layers of PCIe.

In an example, CXL supports single-level switching to enable fan-out to multiple devices. This enables multiple devices in a platform to migrate to CXL, while maintaining backward compatibility and the low-latency characteristics of CXL.

In an example, CXL can provide a standardized compute fabric that supports pooling of multiple logical devices (MLD) and single logical devices such as using a CXL switch connected to several host devices or nodes (e.g., Root Ports). This feature enables servers to pool resources such as accelerators and/or memory that can be assigned according to workload. For example, CXL can help facilitate resource allocation or dedication and release. In an example, CXL can help allocate and deallocate memory to various host devices according to need. This flexibility helps designers avoid over-provisioning while ensuring best performance. The CXL protocol enables the construction of large, multi-host, fabric attached memory system. Furthermore, CXL memory systems can be built out of multi-ported, hot swappable device and connected with hot swappable memory switches.

CXL 3.0 can provide the ability for a fabric attached memory device to provide shared memory which can be read and written by multiple hosts.

Some of the compute-intensive applications and operations mentioned herein can require or use large data sets. Memory devices that store such data sets can be configured for low latency and high bandwidth and persistence. One problem of a load-store interconnect architecture includes guaranteeing persistence. CXL can help address the problem using an architected flow and standard memory management interface for software, such as can enable movement of persistent memory from a controller-based approach to direct memory management.

One problem with large scale distributed memory systems is reliability. As the number of components in these systems increase, the number of failure points also increase. For large memory systems, the chances of media failures on a particular memory device increase. In addition to media failures, many faults may not be directly connected with media failure. For example, many failures may be connected to power delivery systems, memory fabrics, cables, and other miscellaneous issues. Modern microprocessors are not able to gracefully deal with memory read request failures. At best, applications which don't have their load instruction satisfied within a short time frame are terminated. In many cases, all processes and the OS running on a server are terminated, causing a server reboot. This hurts the availability of servers using memory modules and memory fabrics.

Disclosed in some examples are methods, systems, devices, and architectures which provide techniques for memory device and memory fabric redundancy within distributed memory systems. In some examples, two memory devices are paired and each stores a same set of data such that writes to the memory devices are duplicated and reads may be satisfied from either device. In some examples, a memory processing unit (MPU) may be incorporated into the memory architecture to support these paired memory devices. The MPU may be placed between the host and a multi-planed memory fabric which connects to multi-ported CXL memory devices. In some examples, the MPU may also enable the use of alternative fabric links. That is, if a memory fabric link between the MPU and a memory device is unavailable, an alternative link may be utilized to restore connectivity to a memory device.

FIG. 1 illustrates a schematic diagram of a system topology 100 with availability improving hardware according to some examples of the present disclosure. A host system 105, which may include one or more processors may be connected to a memory processing unit (MPU) 110. MPU 110 may be part of host system 105 or may be connected to MPU 110 through a communications interface. MPU 110 may include a host interface 112 for communicating with the host system 105, a memory mirroring and active fabric failure tolerance engine 114 for implementing failure tolerance techniques, such as those disclosed herein, and a fabric interface 116 for interfacing with a memory fabric. Fabric plane A 120 and Fabric Plane B 118 form redundant fabric links to a plurality of multi-ported CXL devices 122, 124 and 126. Fabric manager 128 manages the memory fabrics. In FIG. 1, the dashed connections represent CXL links over a CXL.mem protocol. In some examples, the MPU 110 may be or include one or more hardware devices, such as processors, memory, application specific integrated circuit (ASIC), custom silicon, or the like.

In some examples, to allow the host processor to continue to function despite memory module problems, the memory mirroring and active fabric failure tolerance engine 114 mirrors all write requests to two different memory devices. These devices are referred to herein as a memory device pair, consisting of memory device A and memory device B. In contrast to write requests which are sent to both devices in the pair, read requests are serviced by a primary device first and the secondary device is not utilized unless the primary device does not respond or is unavailable. By dividing memory devices up into primary and secondary devices, this increases memory bandwidth that is used for servicing read requests during normal operation. That is, two memory reads targeting different physical devices of the memory device pair may be serviced simultaneously, or nearly simultaneously. Various methods may be utilized for selecting which device of the pair is the primary device and which is the secondary device. In some examples, one or more address bits may be utilized to determine the primary address. For these examples, some addresses select device A as a primary device and other addresses select device B as the primary device. In some examples, the bit above the most significant bit of the host physical address is used to determine whether the primary device (i.e., the device that services read requests first) is device A or device B of the memory device pair.

Figure 2:
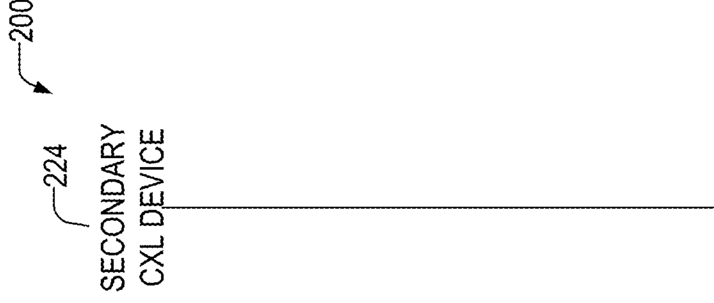
FIG. 2 illustrates a messaging diagram of a read request following a normal path and being serviced by the primary CXL device according to some examples of the present disclosure.
Figure 2:
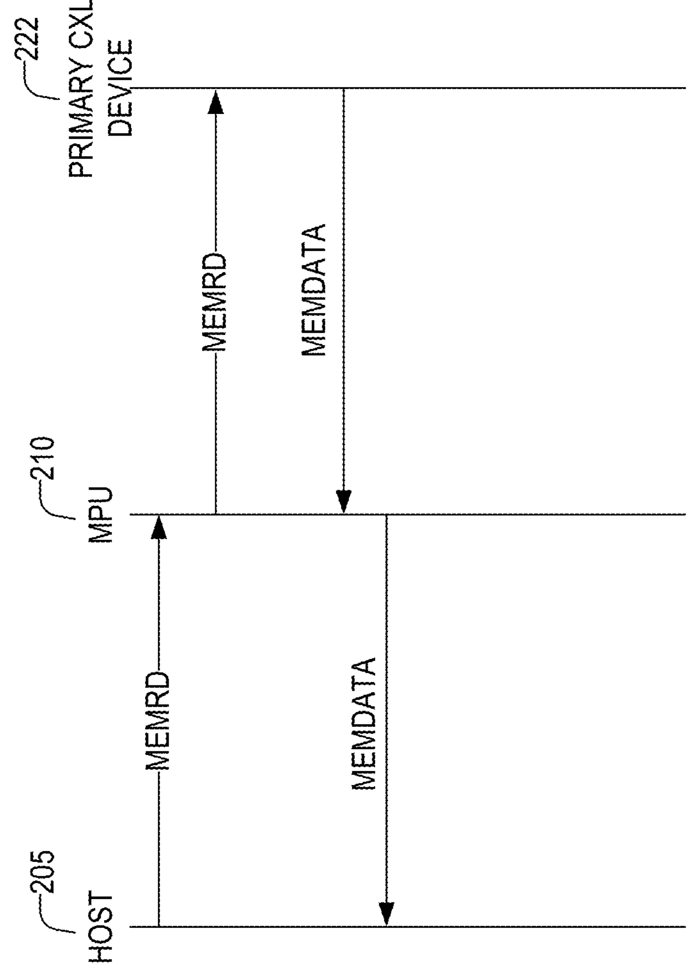

As noted, read requests may be first sent to the primary device and if the response fails, the read request is forwarded to the secondary device. FIG. 2 illustrates a messaging diagram 200 of a read request following a normal path and being serviced by the primary CXL device 222 according to some examples of the present disclosure. The host 205 sends a MEMRD (memory read) request to the MPU 210. The MPU 210 determines which CXL device is the primary device corresponding to the request. For example, using the address of the request. The MPU 210 then forwards the request to the primary CXL device 222. In some examples, the MPU sets a timer that is less than a timeout value of the host 205. If the timer expires, then the MPU 210 may retry the request (e.g., over an alternative fabric link) or send the request to the secondary CXL device 224. In the example of FIG. 2, the primary CXL device 222 responds with data, which is then forwarded by the MPU 210 back to the host 205.

Figure 3:
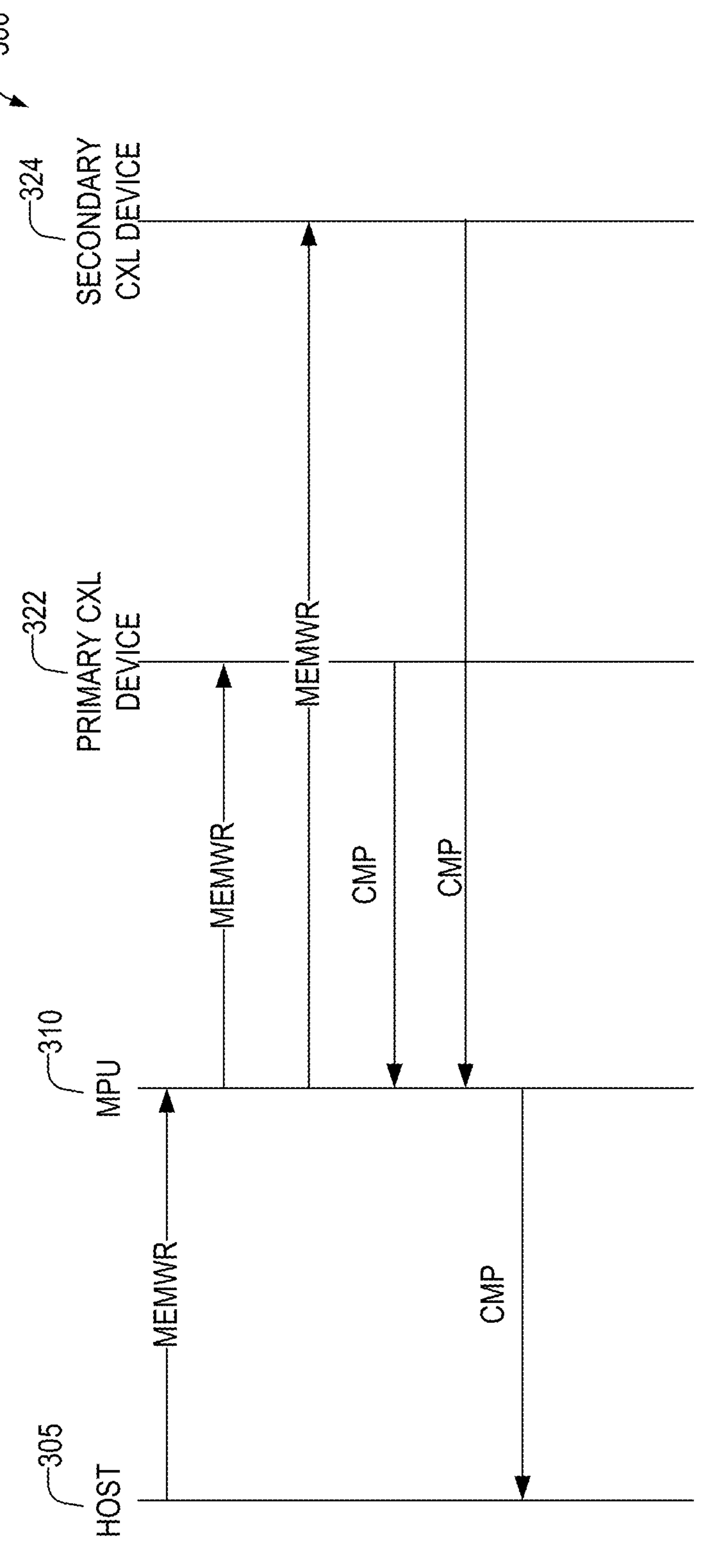
FIG. 3 illustrates a messaging diagram of a write request according to some examples of the present disclosure.

FIG. 3 illustrates a messaging diagram 300 of a write request according to some examples of the present disclosure. The host 305 sends a memory write request MEMWR to the MPU 310, which forwards the write request to both the primary CXL device 322 and the secondary CXL device 324. Each device provides a completion message CMP back to the MPU. Once both CMP messages are received, the MPU 310 may forward a CMP back to the host 305.

In some examples, as previously noted, the system may employ alternative paths and/or redundant fabrics to avoid faulty fabric components and links. Thus, in some examples, a read or write command that does not complete successfully may time out and in response, the MPU may try an alternative path or redundant fabric. In some examples, for read requests, the MPU may try the alternative path and/or redundant fabric before trying the secondary device.

Figure 4:
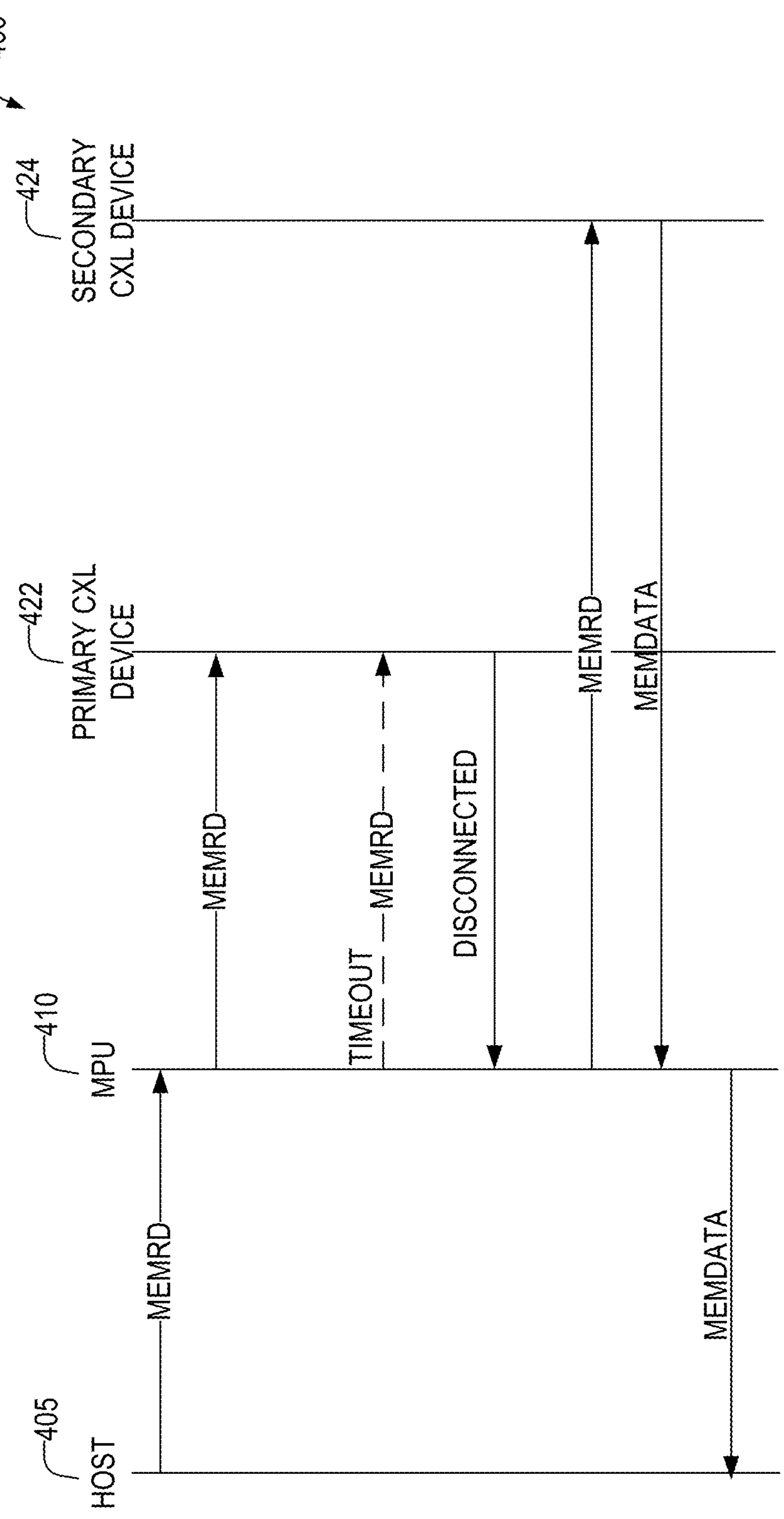
FIG. 4 illustrates a messaging diagram of a read request being serviced by the secondary CXL device according to some examples of the present disclosure.

FIG. 4 illustrates a messaging diagram 400 of a read request being serviced by the secondary CXL device 424 according to some examples of the present disclosure. The host 405 sends a MEMRD (memory read) request to the MPU 410. The MPU 410 determines which CXL device is the primary device corresponding to the request. For example, using the address of the request. The MPU 410 then forwards the request to the primary CXL device 422. In some examples, the MPU sets a timer that is less than a timeout value of the host 405. If the timer expires, then the MPU 210 may retry, e.g., by utilizing an alternative path or redundant fabric. In these examples, the MPU 410 resets the timer. Upon a timeout (not shown), or a disconnect notification (as shown), the MPU 410 may send the MEMRD to the secondary CXL device 424. The response (MEMDATA) is then forwarded by the MPU 410 to the host 405. If the secondary CXL device 424 fails to return the data, then the MPU 410 may send an error, such as a poison, to the host.

The following is example pseudocode of the read request algorithm executed by the MPU:

```
1:  if(ResponsePoisonData( )) {
2:      IssueToSecondary( );
3:      if(ResponsePoisonData( )) {
4:          ReturnPoison( );
5:      }
6:      else if(Disconnected( ) || Timeout( )) {
7:          TryAlternativeFabricLink( );
8:          if(Disconnected( ) || SecondTimeout( )) {
9:              ReturnPoison( );
10:         }
11:     }
12: }
13: else {
14:     if(Disconnected( ) || Timeout( )) {
15:         TryAlternativeFabricLink( );
16:         if(Disconnected( ) || SecondTimeout( )) {
17:             TrySecondaryDevice( );
18:             FailOver( );
19:             if(Disconnected( ) || ThirdTimeout( )) {
20:                 ReturnPoison( );
21:             }
22:         }
23:     }
24: }
```

The pseudocode begins at line 1 after the memory read request has been sent to the primary CXL device. If, at line 1, the response from the primary CXL device is a "poison" response—indicating an error, the MPU issues the request to the secondary device at line 2. If, at line 3, that device returns poison, then the MPU returns poison to the host at line 4. Otherwise, at line 6, if the secondary device is disconnected or times out, then the MPU reissues the request over an alternative fabric link to the second device at line 7. If that alternative fabric link is disconnected or times out again, the MPU returns poison at line 9.

If the first device did not respond with poison, but either returned a disconnected or timed out, then the MPU reissues the request over an alternative fabric link to the first device at line 15. If that attempt either reports a disconnect or a second timeout at line 16, then the MPU tries the secondary device and issues a failover at line 18. At line 19, if the secondary device is disconnected, or times out, then at line 20, poison is returned. In the pseudocode above, if at any point, good data is returned by either the primary or secondary device, then that data is returned back to the host.

The pseudocode for the write command is below:

```
1:  if(Disconnected( ) || Timeout( )) {
2:      TryAlternativeFabricLink( );
3:      if(Disconnected( ) || SecondTimeout( )) {
4:          if(Primary( )) {
5:              FailOver( );
6:          }
7:      }
8:  }
```

If a write command returns a disconnected status or times out, then the MPU tries an alternative fabric link. If that fails with either a disconnect or a second timeout, the MPU fails over to the secondary if the failed device is a primary device.

The various timeouts may be specifically configured to be greater than queueing delays and link retraining events of the PCIe link, but less than the PCIe devices timeouts and processor last level cache timeout. For example, the queuing delays may be microseconds, link retraining events may be between 5 and 75 microseconds, a fabric fail-over timeout may be 10 ms, the mirroring timeout may be 20 ms, and a second mirroring timeout may be 30 ms. The PCIe devices timeout may be 50 ms and the processor last level cache timeout may be 100 ms. In some examples, precise control of the Fabric Timeouts may be possible with per-request timeout count bits and a single global timer counting with a. 1 microsecond resolution. By properly sizing timeouts, the disclosed failure mechanisms may be successfully run without triggering a host timeout, but also without being interrupted by link retraining and other tasks.

Figure 5:
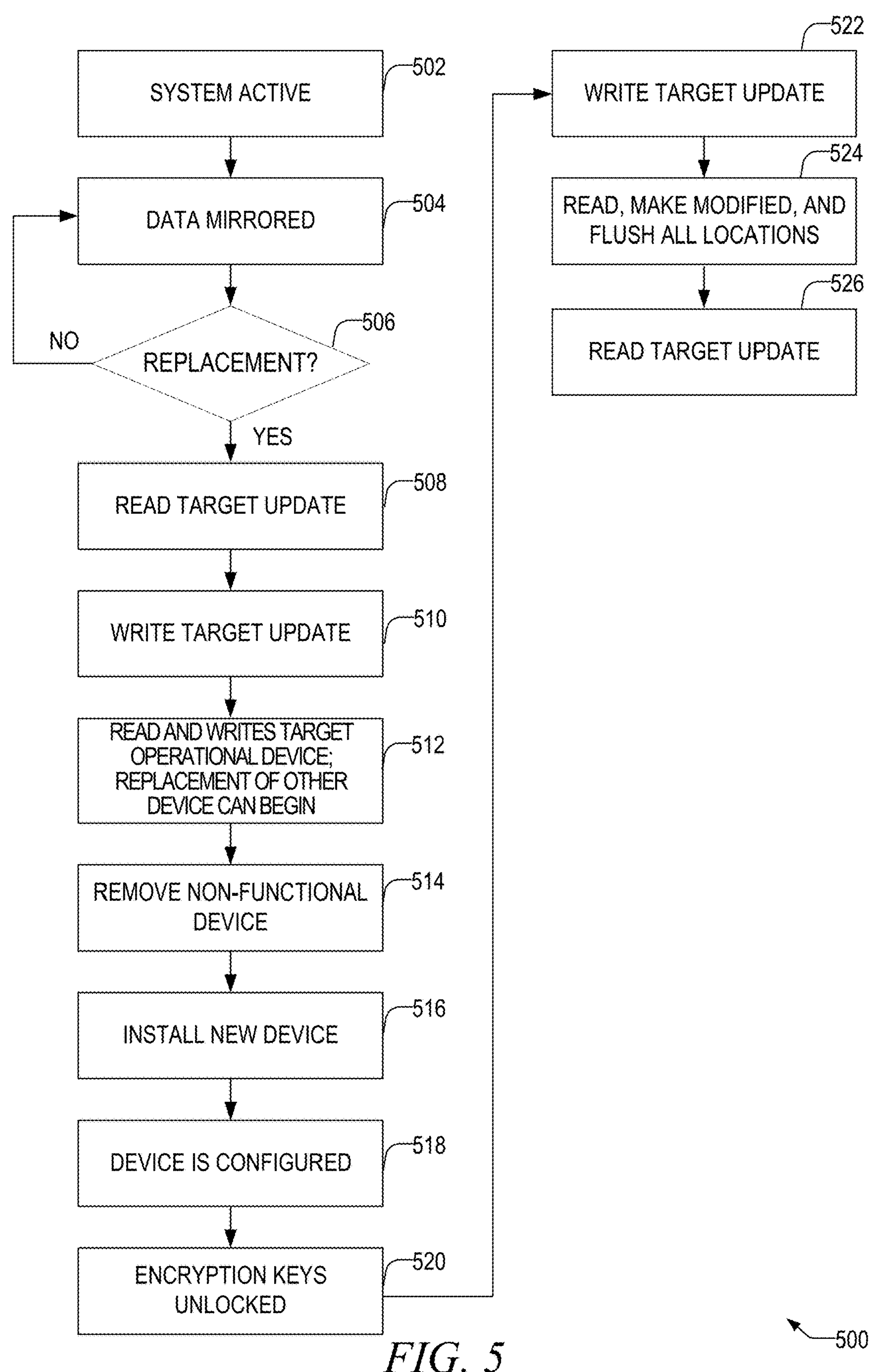
FIG. 5 illustrates a flowchart of a device replacement according to some examples of the present disclosure.

FIG. 5 illustrates a flowchart 500 of a device replacement according to some examples of the present disclosure. In some examples, to enable replacement of CXL devices by a relatively slow fabric manager, the MPU may have independent read and write targeting to allow for on-line replacement of memory devices without causing software timeouts. This process is shown in FIG. 5. At operation 502 the, the CXL memory devices go active, and the system begins running. At operation 504, data mirroring may be activated. Data mirroring may be activated for one or more specific memory addresses as determined by an administrator, a software application, or the like. At operation 506, the MPU may determine whether any events have indicated a need to replace one or more mirrored CXL memory devices. Examples include module failover indications, poison responses, timeout responses, an operator signaling an intent to replace a device (e.g., through a UI), or the like. If no replacement event is present, then the system maintains a steady state at operation 504. If there is a replacement event, then at operation 508, the system updates the read targets. For example, the MPU updates an address table that defines the memory device pairs to indicate that one of the devices in the memory device pairs that is to be replaced is not available. At operation 510, this process is repeated for write targets. At this point, at operation 512, all read requests and write requests target the operational device of the pair of devices and replacement of the non-operational device may begin.

At operation 514, the operator may remove the non-functional device. At operation 516, the operator may install the new device. At operation 518, the new device may be configured. At operation 520 one or more encryption keys of one or more tenants may be unlocked. At operation 522, the new device may be brought into service and the write target updated to include the newly in-service device. At this point, the MPU causes the data from the operational device to be copied to the newly installed device. This may be done at operation 524 by reading all the data from the operational device, setting the modified bit for that data, and flushing all locations. This causes the data to be written by the MPU to both memory devices. At operation 526, once the data is consistent between both devices, the read target is updated.

Figure 6:
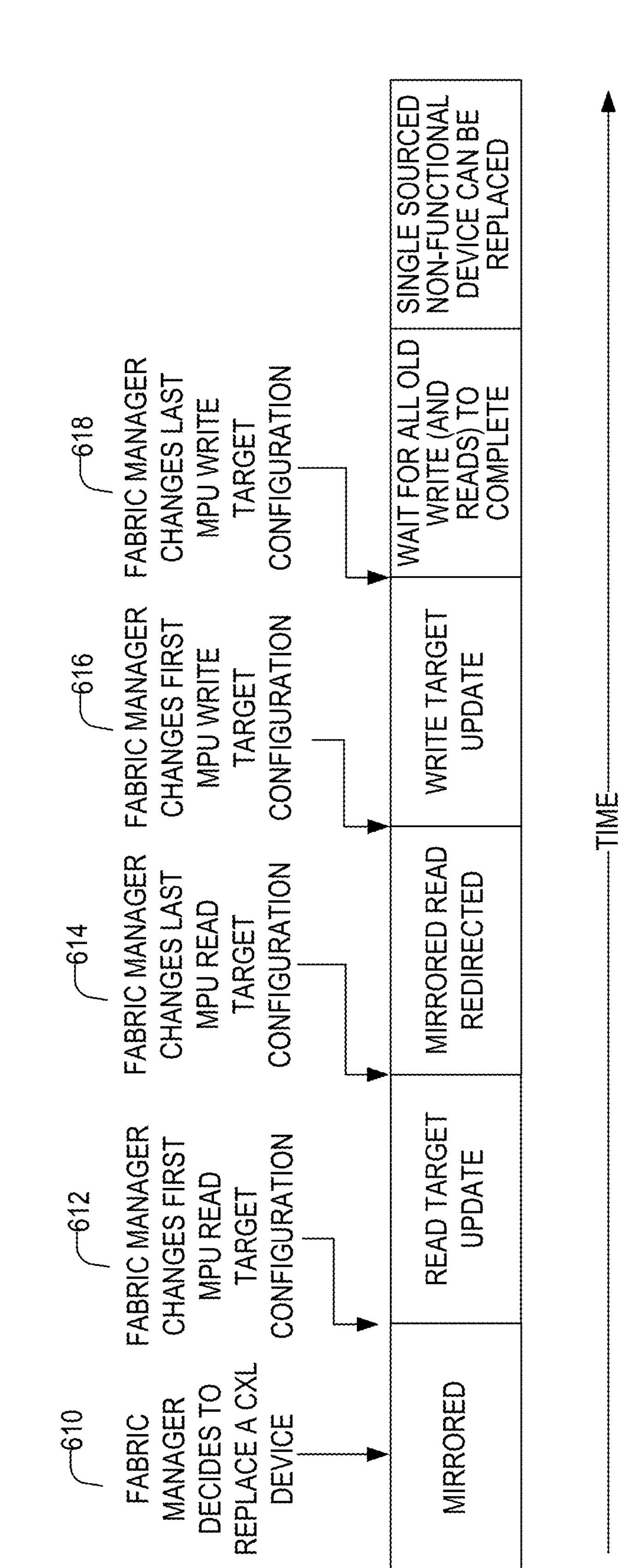
FIG. 6 illustrates a sequence diagram illustrating fabric manager involvement in a device replacement according to some examples of the present disclosure.

FIG. 6 illustrates a sequence diagram 600 illustrating fabric manager involvement in a device replacement according to some examples of the present disclosure. FIG. 6 corresponds to FIG. 5. The fabric manager notifies the MPUs at 610 that a particular CXL device is being shut down. The fabric manager may determine a list of one or more MPUs that service the devices that are being shut down. At 612, the fabric manager changes the read target configuration of the first MPU in the list. At operation 614, the fabric manager changes the read target configuration of the last MPU in the list. At this point the mirrored reads to the out of service device are redirected to the other device in the buddy-pair. At operation 616 the fabric manager changes the write target of the first MPU in the list. At operation 618, the fabric manager changes the target configuration of the last MPU in the list. At this point the system waits for all old write and reads to complete, and the out of service device may be replaced. After the device is completed, and although not shown in FIG. 6, but shown in FIG. 5 the write targets of the MPUs are updated first, then all the data is read, made modified, and then flushed, followed by the read target updates.

Figure 7:
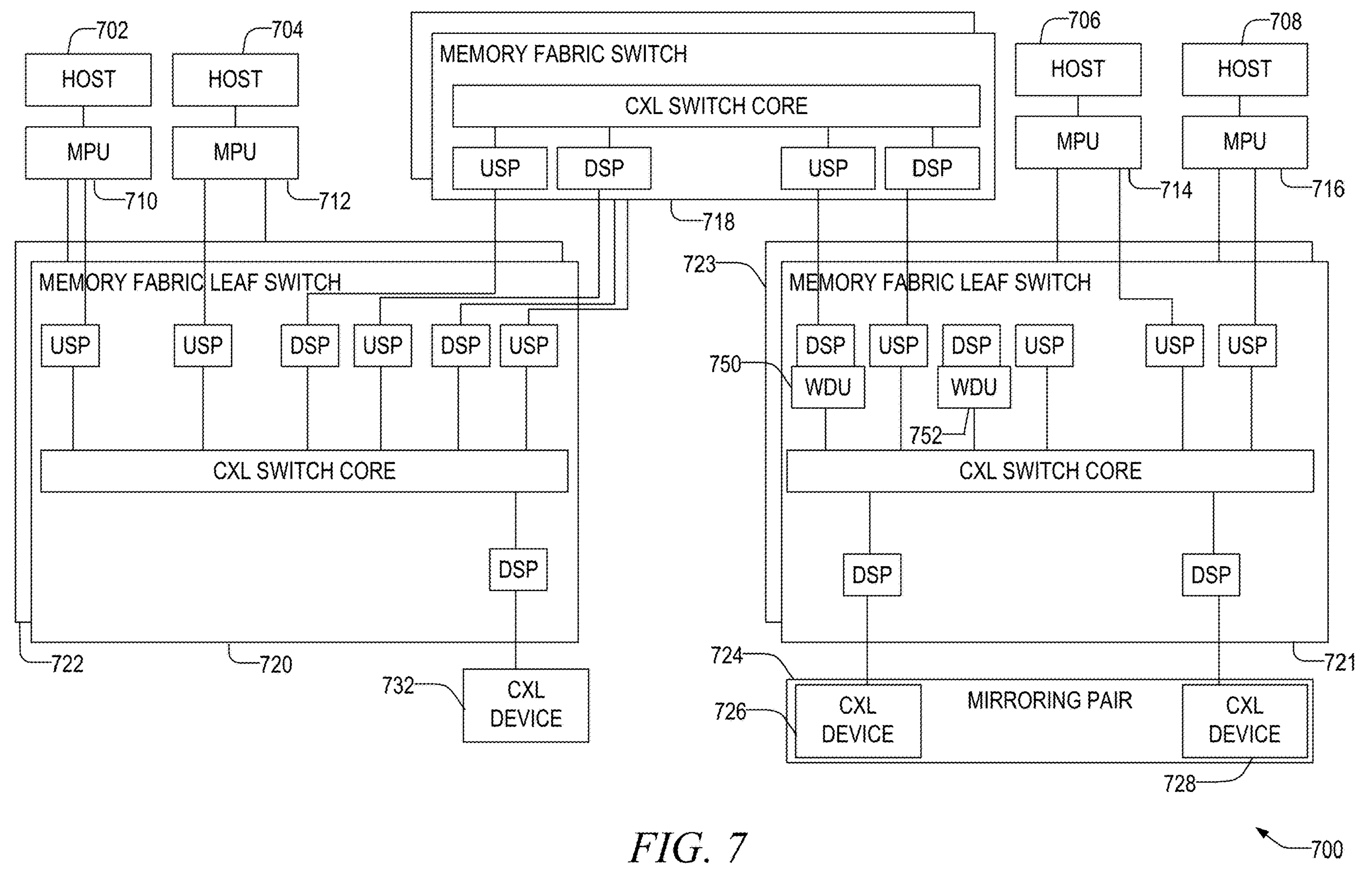
FIG. 7 illustrates a diagram of the MPU positioned within multiple levels of memory fabric switching.

The disclosed techniques also function with multiple levels of memory fabric switching. FIG. 7 illustrates a diagram 700 of the MPU positioned within multiple levels of memory fabric switching. As shown in FIG. 7, the memory fabric switch 718 includes a switch core and one or more upstream switch ports (USP) and downstream switch ports (DSP). Hosts, such as hosts 702, 704, 706, and 708 are connected to MPUs 710, 712, 714, and 716. The MPUs are in turn connected to USPs in one or more memory fabric leaf switches, such as memory fabric leaf switches 720, 721, 722, and 723. As with the memory fabric switch 718, the memory fabric leaf switches include CXL switch cores, USPs and DSPs. As shown in FIG. 7, the MPUs (e.g., MPU 710, 712, 714, and 716) are positioned between the first upstream switching port (USP) on the memory fabric and the host. CXL devices 732, 726 and 728 are connected to the DSP of the memory fabric leaf switches 720 and 721 respectively. CXL devices 726 and 728 are in a mirroring pair 724. In some examples, a write duplication unit (WDU) 750, 752 may be installed at the last leaf switch. This may save some fabric bandwidth by performing the write duplication further down in the fabric. In some examples, this may be feasible by placing the mirrored pairs on the same last level leaf switch, as shown in FIG. 7.

Figure 8:
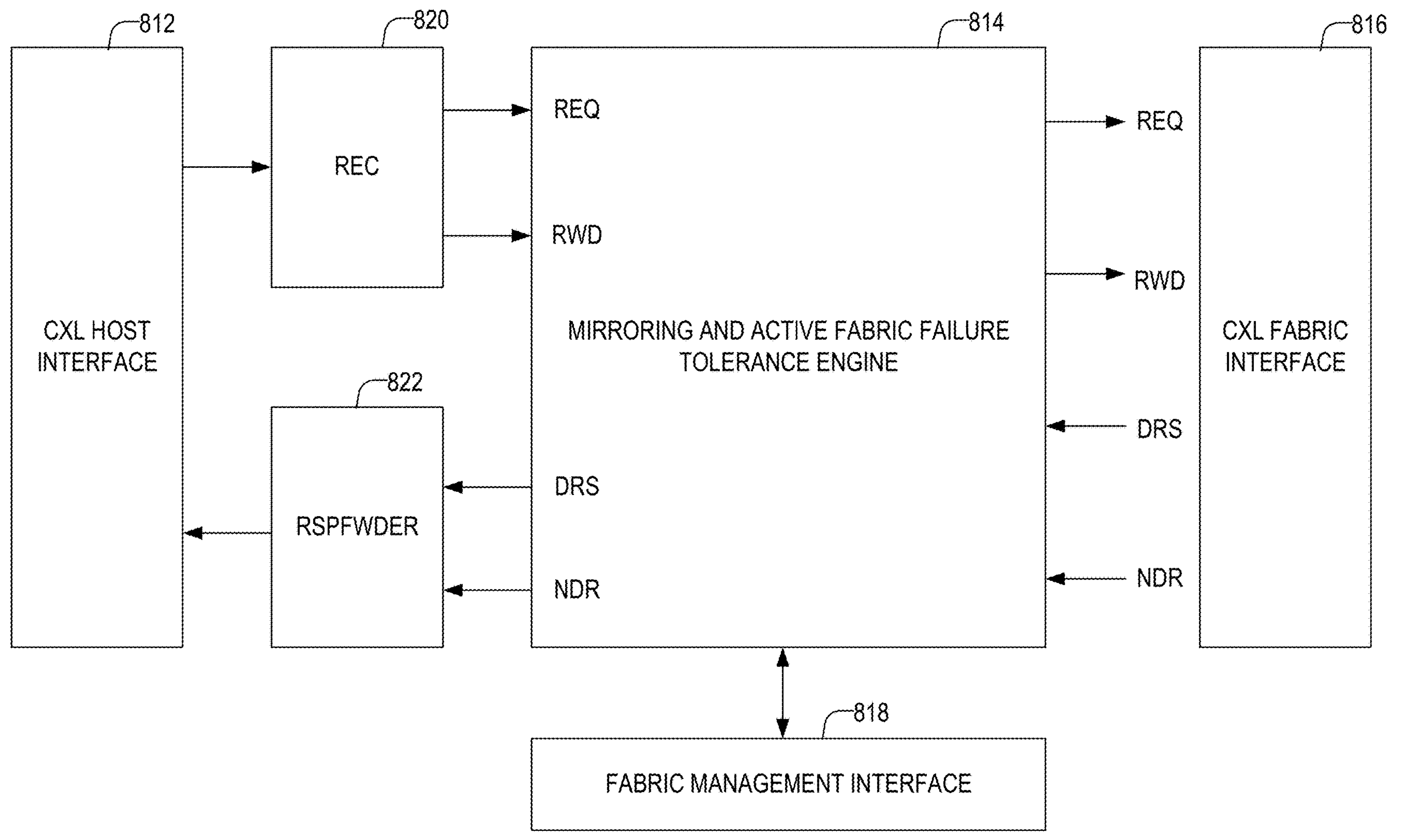
FIG. 8 illustrates a diagram of the mirroring and active fabric failure tolerance engine 814 according to some examples of the present disclosure.

FIG. 8 illustrates a diagram of the mirroring and active fabric failure tolerance engine 814 according to some examples of the present disclosure. The CXL host interface 812 sends, from the host to the mirroring and active fabric failure tolerance engine 814 of the MPU, both requests (REQ) and requests with data (RwD) via the receiving component (REC) 820. For example, a write request (e.g., with data), a read request, or the like. The mirroring and active fabric failure tolerance engine may then handle the REQ or RwD appropriately. For example, for write requests, the request may be duplicated and sent to both CXL device pairs over the CXL Fabric Interface 816. For read requests, the mirroring and active fabric failure tolerance engine determines which device of the device pair is to service the read request (e.g., based upon the address). If the CXL fabric interface 816 reports that the device is unreachable, alternative fabrics, routes, or links may be tried. The responses, a data response (DRS), a no data response (NDR) may be received by the mirroring and active fabric failure tolerance engine and processed according to FIGS. 2-6 and the description herein. The mirroring and active fabric failure tolerance engine may forward these responses to the response forwarder (RSPFWDER) component 822 which forwards it to the host via the CXL host interface 812. The mirroring and active fabric failure tolerance engine 814 may also communicate with the fabric manager via the fabric management interface 818.

Mirroring can be expensive to implement. To mitigate this cost, a mechanism may be provided for controlling the mirroring policy and memory failure signaling policy on a 1 GB page basis. Large memory systems are often forced into using large pages to achieve good processor performance. Furthermore, the large pages enable the page policy table to reside in on-die memory without compromising the largest memory size supported by CXL ($2^{52}$ bytes). The following table compares the various modes that may be enabled in the CXL system for each page:

| Page Policy | Mirroring Policy | Error Signaling Policy | Comment |
|---|---|---|---|
| Mirrored | Mirrored | Poison On Failure | Great Availability; No Application Software Change Needed |
| NotMirrored | NotMirrored | Poison on Failure | Lower Availability; No Application Software Change Needed |
| SoftwareRecovery | NotMirrored | Return Bad Value | Great Availability; Application Software Change Needed |

In some examples, a software recovery policy may be defined which, instead of returning a POISON signal on failure (which typically resets the host), the system may return a specified "bad" value or error code. The bad value or error code is then handled using exception handling in the software applications. While this has better availability than standard systems as the poison no longer terminates the host, this solution requires changes to the application software, whereas the MPU and mirrored memory do not.

Figure 9:
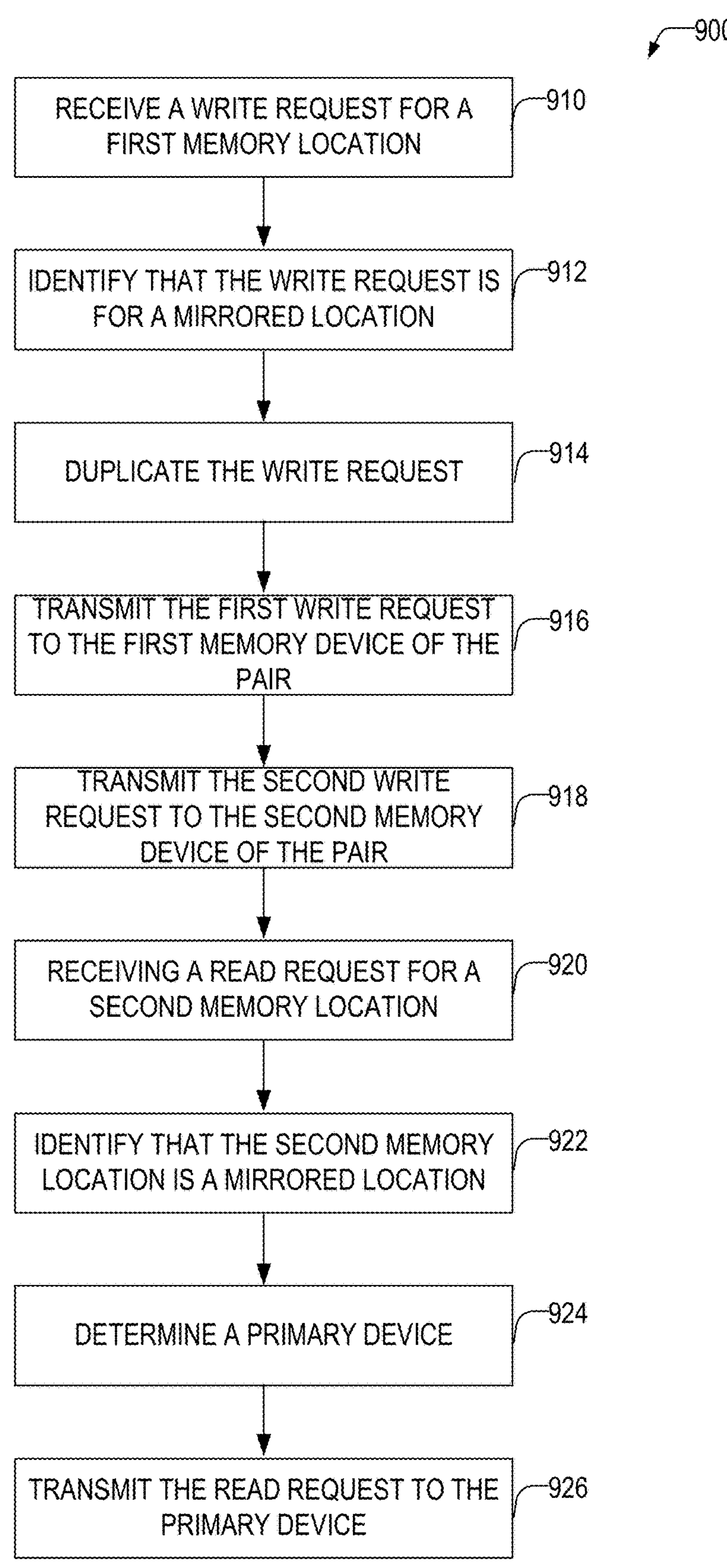
FIG. 9 illustrates a flowchart of a method of mirroring and active fabric failure tolerance in a distributed memory system according to some examples of the present disclosure.

FIG. 9 illustrates a flowchart of a method 900 of mirroring and active fabric failure tolerance in a distributed memory system according to some examples of the present disclosure. In some examples, method 900 may be performed at an MPU connected across a host interface to a host, and to memory devices through a memory fabric interface. At operation 910 the MPU may receive a write request for a first memory location. At operation 912, the MPU may identify, that the first memory location is a mirrored memory location corresponding to a pair of memory devices comprising a first memory device and a second memory device.

This determination may be made, for example, based upon the address in the request and a lookup table listing mirrored addresses, specific ranges of addresses, or the like. At operation 914, the MPU may duplicate the write request to create a first write request and a second write request. At operation 916, the MPU may transmit the first write request to the first memory device over the memory fabric interface. For example, using a table, the MPU may determine, from the memory address, the first memory device and set one or more routing fields of the request so that the request is routed to the first memory device. At operation 918, the MPU may transmit the second write request to the second memory device over the memory fabric interface. For example, using the table, the MPU may determine, from the memory address, the second memory device and set one or more routing fields of the request so that the request is routed to the second memory device.

In some examples, the MPU may wait for responses from each memory device. If both devices replied successfully, then the MPU may forward one or more of the reply messages to the host. If one or more of the devices times out, then the MPU may attempt a different fabric or route for the one or more devices. If the MPU receives a successful reply message from the one or more devices, then a successful reply may be forwarded to the host. If a failure occurs again on one or more of the devices, the MPU may send an indication of failure to the host, such as a failover indication. A failover indication may trigger one or more procedures for replacing the failed device, such as by updating read and/or write targets so that future read and/or write requests are directed at the memory device that is still working.

At operation 920, the MPU may receive a read request for a second memory location. At operation 922, the MPU may identify that the second memory location is a mirrored memory location corresponding to the pair of memory devices. For example, by referencing the memory location in a table of paired memory locations. At operation 924 the MPU may determine a primary device to satisfy the read command. For example, based upon one or more bits in the address, a round-robin scheme (where requests to a particular pair of devices are handled by alternating devices), determining whether the first device or the second device is currently busy (and thus servicing the read request from the non-busy device), or the like. At operation 926, the read request may be transmitted to the primary device.

If the read request sent to the primary device is not successful, an alternative fabric or route may be tried. If the alternative fabric or route is not successful, then the secondary device may be tried. If the read request is not successful when sent to the secondary device, an alternative fabric or route may be tried. If the alternative fabric or route is not successful, then an error may be sent to the host.

Figure 10:
FIG. 10 illustrates a diagram of roles for removing and replacing a non-functional device according to some examples of the present disclosure.
Figure 10:
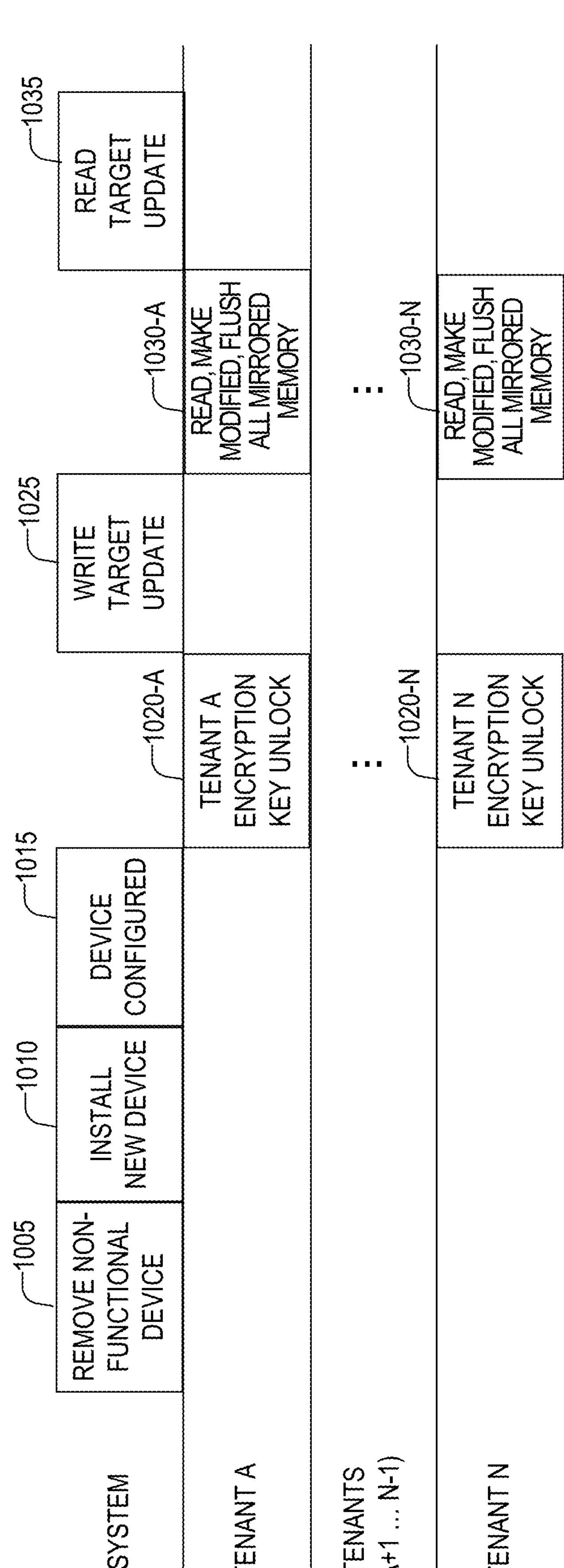

FIG. 10 illustrates a diagram 1000 of roles for removing and replacing a non-functional device according to some examples of the present disclosure. At operation 1005 an administrator of the system removes a non-functional device. At operation 1010 the new device is installed and at operation 1015 the new device is configured. At this point, each tenant A-N unlocks their encryption keys at operation 1020-A . . . 1020-N. This unlock may be done via one or more applications that are executing with the tenant's permission. At operation 1025, the write targets are updated. At operations 1020-A . . . 1030-N, each tenant reads, makes modified, and flushes entries in the mirrored memory. At operation 1035, the system then updates the read targets.

Figure 11:
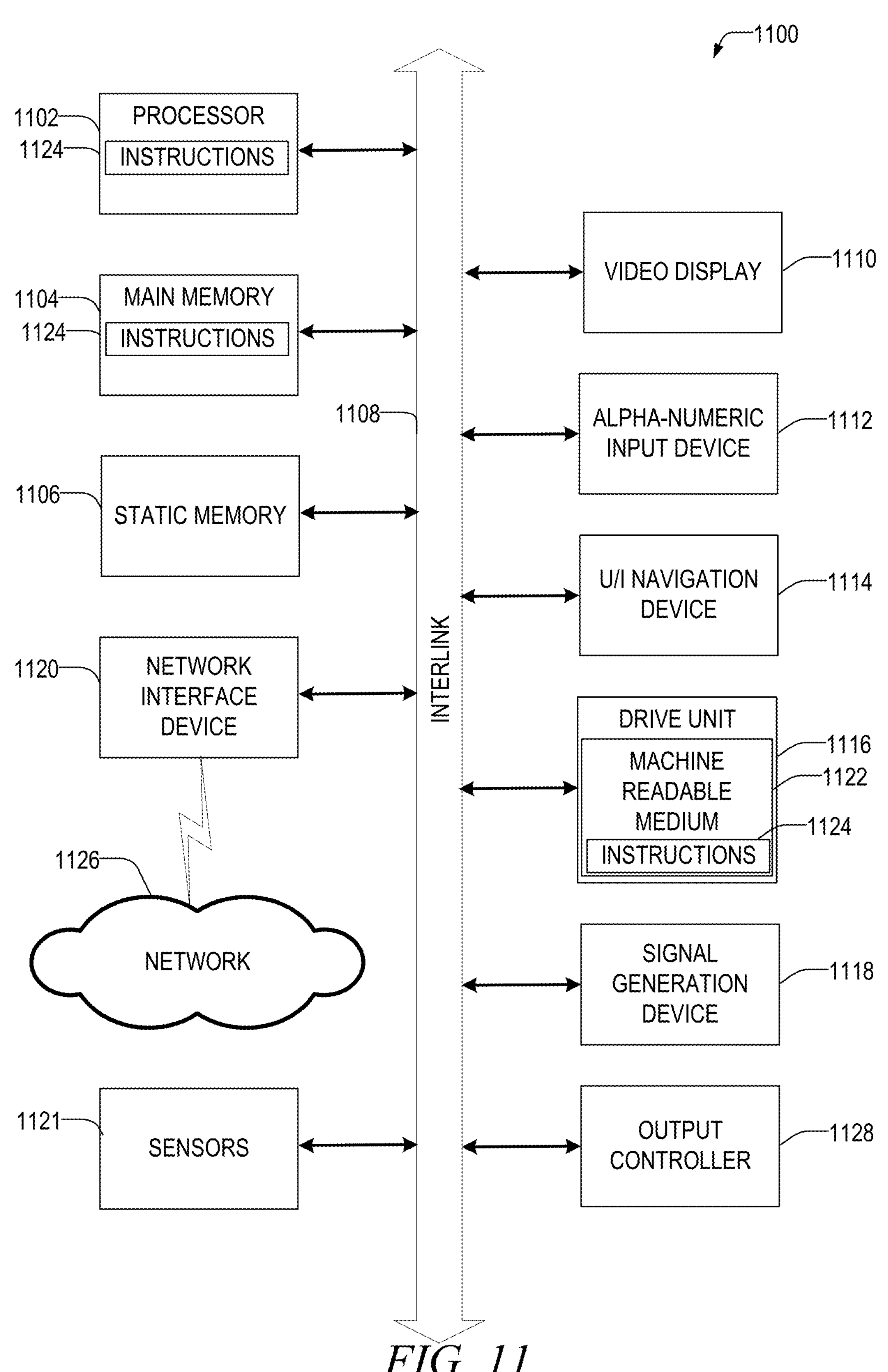
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may be performed. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 1100 may be part of or implement a distributed memory architecture, such as shown in FIGS. 1 and 7; implement the components of FIG. 8; the messaging flows of FIGS. 2-4; and the methods of FIGS. 5, 6, 9, and 10.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1100 may include one or more hardware processors, such as processor 1102. Processor 1102 may be a central processing unit (CPU), a graphics processing unit (GPU), a hardware processor core, or any combination thereof. Machine 1100 may include a main memory 1104 and a static memory 1106, some or all of which may communicate with each other via an interlink (e.g., bus) 1108. Examples of main memory 1104 may include Synchronous Dynamic Random-Access Memory (SDRAM), such as Double Data Rate memory, such as DDR4 or DDR5. Interlink 1108 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1124 may further be transmitted or received over a communications network 1126 using a transmission medium via the network interface device 1120. The Machine 1100 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

Example 1 is a method for failure fault tolerance in a distributed memory system, the method comprising: at a memory processing unit connected across a host interface to a host and a memory fabric interface to a plurality of memory devices: receiving, from the host across the host interface, a write request for a first memory location; identifying that the first memory location is a mirrored memory location corresponding to a pair of memory devices comprising a first memory device and a second memory device; duplicating the write request to create a first write request and a second write request; transmitting the first write request to the first memory device over the memory fabric interface; and transmitting the second write request to the second memory device over the memory fabric interface.

In Example 2, the subject matter of Example 1 includes, receiving a read request for a second memory location; identifying that the second memory location is a mirrored memory location corresponding to the pair of memory devices; determining a primary memory device as either the first or second memory device; and transmitting the read request to the primary memory device over the memory fabric interface.

In Example 3, the subject matter of Example 2 includes, wherein determining the primary memory device as either the first or second memory device comprises utilizing one or more bits in an address of the second memory location.

In Example 4, the subject matter of Examples 2-3 includes, setting a timer prior to transmitting the read request to the primary memory device; receiving a timer expiry prior to receiving a response from the primary memory device; and responsive to receiving the timer expiry prior to receiving the response from the primary memory device, retransmitting the read request to the primary memory device over an alternative memory fabric link.

In Example 5, the subject matter of Example 4 includes, setting a second timer prior to retransmitting the read request to the primary memory device over the alternative memory fabric link; receiving a second timer expiry prior to receiving the response from the primary memory device over the alternative memory fabric link; and responsive to receiving the second timer expiry prior to receiving the response from the primary memory device over the alternative memory fabric link, retransmitting the read request to the secondary memory device.

In Example 6, the subject matter of Examples 1-5 includes, determining that the first memory device is to be replaced; responsive to determining that the first memory device is to be replaced: updating a read target data structure to identify that the first memory device is out of service; updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

In Example 7, the subject matter of Example 6 includes, identifying that a replacement memory device for the first memory device has been installed; updating the write target data structure to identify that the replacement memory device and the second memory device are a pair of memory devices; reading the data from the second memory device; setting the data from the second memory device as modified; flushing the data from the second memory device; and updating the read target data structure to identify that the replacement memory device and the second memory device are a pair of memory devices.

Example 8 is a memory processing unit, for providing failure fault tolerance in a distributed memory system, the memory processing unit comprising: a processor, configured to perform operations comprising: receiving, from a host across a host interface, a write request for a first memory location; identifying that the first memory location is a mirrored memory location corresponding to a pair of memory devices comprising a first memory device and a second memory device; duplicating the write request to create a first write request and a second write request; transmitting the first write request to the first memory device over a memory fabric interface; and transmitting the second write request to the second memory device over the memory fabric interface.

In Example 9, the subject matter of Example 8 includes, wherein the operations further comprise: receiving a read request for a second memory location; identifying that the second memory location is a mirrored memory location corresponding to the pair of memory devices; determining a primary memory device as either the first or second memory device; and transmitting the read request to the primary memory device over the memory fabric interface.

In Example 10, the subject matter of Example 9 includes, wherein the operations of determining the primary memory device as either the first or second memory device comprises utilizing one or more bits in an address of the second memory location.

In Example 11, the subject matter of Examples 9-10 includes, wherein the operations further comprise: setting a timer prior to transmitting the read request to the primary memory device; receiving a timer expiry prior to receiving a response from the primary memory device; and responsive to receiving the timer expiry prior to receiving the response from the primary memory device, retransmitting the read request to the primary memory device over an alternative memory fabric link.

In Example 12, the subject matter of Example 11 includes, wherein the operations further comprise: setting a second timer prior to retransmitting the read request to the primary memory device over the alternative memory fabric link; receiving a second timer expiry prior to receiving the response from the primary memory device over the alternative memory fabric link; and responsive to receiving the second timer expiry prior to receiving the response from the primary memory device over the alternative memory fabric link, retransmitting the read request to the secondary memory device.

In Example 13, the subject matter of Examples 8-12 includes, wherein the operations further comprise: determining that the first memory device is to be replaced; responsive to determining that the first memory device is to be replaced: updating a read target data structure to identify that the first memory device is out of service; updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

In Example 14, the subject matter of Example 13 includes, wherein the operations further comprise: identifying that a replacement memory device for the first memory device has been installed; updating the write target data structure to identify that the replacement memory device and the second memory device are a pair of memory devices; reading the data from the second memory device; setting the data from the second memory device as modified; flushing the data from the second memory device; and updating the read target data structure to identify that the replacement memory device and the second memory device are a pair of memory devices.

Example 15 is a non-transitory machine-readable medium, storing instructions, for failure fault tolerance in a distributed memory system, the instructions, when executed by a memory processing unit connected across a host interface to a host and a memory fabric interface to a plurality of memory devices, cause the memory processing unit to perform operations comprising: receiving, from the host across the host interface, a write request for a first memory location; identifying that the first memory location is a mirrored memory location corresponding to a pair of memory devices comprising a first memory device and a second memory device; duplicating the write request to create a first write request and a second write request; transmitting the first write request to the first memory device over the memory fabric interface; and transmitting the second write request to the second memory device over the memory fabric interface.

In Example 16, the subject matter of Example 15 includes, wherein the operations further comprise: receiving a read request for a second memory location; identifying that the second memory location is a mirrored memory location corresponding to the pair of memory devices; determining a primary memory device as either the first or second memory device; and transmitting the read request to the primary memory device over the memory fabric interface.

In Example 17, the subject matter of Example 16 includes, wherein the operations of determining the primary memory device as either the first or second memory device comprises utilizing one or more bits in an address of the second memory location.

In Example 18, the subject matter of Examples 16-17 includes, wherein the operations further comprise: setting a timer prior to transmitting the read request to the primary memory device; receiving a timer expiry prior to receiving a response from the primary memory device; and responsive to receiving the timer expiry prior to receiving the response from the primary memory device, retransmitting the read request to the primary memory device over an alternative memory fabric link.

In Example 19, the subject matter of Example 18 includes, wherein the operations further comprise: setting a second timer prior to retransmitting the read request to the primary memory device over the alternative memory fabric link; receiving a second timer expiry prior to receiving the response from the primary memory device over the alternative memory fabric link; and responsive to receiving the second timer expiry prior to receiving the response from the primary memory device over the alternative memory fabric link, retransmitting the read request to the secondary memory device.

In Example 20, the subject matter of Examples 15-19 includes, wherein the operations further comprise: determining that the first memory device is to be replaced; responsive to determining that the first memory device is to be replaced: updating a read target data structure to identify that the first memory device is out of service; updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

In Example 21, the subject matter of Example 20 includes, wherein the operations further comprise: identifying that a replacement memory device for the first memory device has been installed; updating the write target data structure to identify that the replacement memory device and the second memory device are a pair of memory devices; reading the data from the second memory device; setting the data from the second memory device as modified; flushing the data from the second memory device; and updating the read target data structure to identify that the replacement memory device and the second memory device are a pair of memory devices.

Example 22 is at least one machine-readable medium including instructions that, when executed by processing circuitry, cause the processing circuitry to perform operations to implement any of Examples 1-21.

Example 23 is an apparatus comprising means to implement of any of Examples 1-21.

Example 24 is a system to implement any of Examples 1-21.

Example 25 is a method to implement any of Examples 1-21.

What is claimed is:

1. A method for failure fault tolerance in a distributed memory system, the method comprising:

at a memory processing unit connected across a host interface to a host and a memory fabric interface to a plurality of memory devices:

receiving, from the host across the host interface, a read request for a first memory location;

identifying that the first memory location is a mirrored memory location corresponding to a pair of memory devices comprising a first memory device and a second memory device;

determining a primary memory device as either the first or second memory device and a secondary memory device as the other of the first or second memory device;

transmitting the read request to the primary memory device over the memory fabric interface;

failing to receive data in the first memory location within a prespecified threshold period of time;

responsive to failing to receive the data in the first memory location within the prespecified threshold period of time, sending the read request to the secondary memory device over the memory fabric interface;

subsequently to sending the read request to the secondary memory device:

receiving, from the host across the host interface, a write request;

duplicating the write request to create a second write request; and transmitting the write request to the primary memory device over the memory fabric interface and the second write request to the secondary memory device over the memory fabric interface.

2. The method of claim 1, wherein determining the primary memory device as either the first or second memory device comprises utilizing one or more bits in an address of the first memory location.

3. The method of claim 1, further comprising:

setting a timer prior to transmitting the read request to the primary memory device, the timer less than the prespecified threshold period of time;

receiving a timer expiry prior to receiving a response from the primary memory device; and responsive to receiving the timer expiry prior to receiving the response from the primary memory device, retransmitting the read request to the primary memory device over an alternative memory fabric link.

4. The method of claim 3, further comprising:

setting a second timer prior to retransmitting the read request to the primary memory device over the alternative memory fabric link;

receiving a second timer expiry prior to receiving the response from the primary memory device over the alternative memory fabric link; and wherein the sending the read request to the secondary memory device over the memory fabric interface is performed responsive to receiving the second timer expiry prior to receiving the response from the primary memory device over the alternative memory fabric link.

5. The method of claim 1, further comprising:

determining that the first memory device is to be replaced;

responsive to determining that the first memory device is to be replaced:

updating a read target data structure to identify that the first memory device is out of service;

updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

6. The method of claim 5, further comprising:

identifying that a replacement memory device for the first memory device has been installed;

updating the write target data structure to identify that the replacement memory device and the second memory device are a pair of memory devices;

reading the data from the second memory device;

setting the data from the second memory device as modified;

flushing the data from the second memory device; and updating the read target data structure to identify that the replacement memory device and the second memory device are a pair of memory devices.

7. A memory processing unit configured to be connected across a host interface to a host and a memory fabric interface to a plurality of memory devices, for providing failure fault tolerance in a distributed memory system, the memory processing unit comprising:

a processor, configured to perform operations comprising:

receiving from a host across a host interface, a read request for a first memory location;

identifying that the first memory location is a mirrored memory location corresponding to a pair of memory devices comprising a first memory device and a second memory device;

determining a primary memory device as either the first or second memory device and a secondary memory device as the other of the first or second memory device;

transmitting the read request to the primary memory device over a memory fabric interface;

failing to receive data in the first memory location within a prespecified threshold period of time;

responsive to failing to receive the data in the first memory location within the prespecified threshold period of time, sending the read request to the secondary memory device over the memory fabric interface;

subsequently to sending the read request to the secondary memory device:

receiving, from the host across the host interface, a write request;

duplicating the write request to create a second write request; and transmitting the write request to the primary memory device over the memory fabric interface and the second write request to the secondary memory device over the memory fabric interface.

8. The memory processing unit of claim 7, wherein the operations of determining the primary memory device as either the first or second memory device comprises utilizing one or more bits in an address of the first memory location.

9. The memory processing unit of claim 7, wherein the operations further comprise:

setting a timer prior to transmitting the read request to the primary memory device, the timer less than the prespecified threshold period of time;

receiving a timer expiry prior to receiving a response from the primary memory device; and responsive to receiving the timer expiry prior to receiving the response from the primary memory device, retransmitting the read request to the primary memory device over an alternative memory fabric link.

10. The memory processing unit of claim 9, wherein the operations further comprise:

setting a second timer prior to retransmitting the read request to the primary memory device over the alternative memory fabric link;

receiving a second timer expiry prior to receiving the response from the primary memory device over the alternative memory fabric link; and wherein the sending the read request to the secondary memory device over the memory fabric interface is performed responsive to receiving the second timer expiry prior to receiving the response from the primary memory device over the alternative memory fabric link.

11. The memory processing unit of claim 7, wherein the operations further comprise:

determining that the first memory device is to be replaced;

responsive to determining that the first memory device is to be replaced:

updating a read target data structure to identify that the first memory device is out of service;

updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

12. The memory processing unit of claim 11, wherein the operations further comprise:

identifying that a replacement memory device for the first memory device has been installed;

updating the write target data structure to identify that the replacement memory device and the second memory device are a pair of memory devices;

reading the data from the second memory device;

setting the data from the second memory device as modified;

flushing the data from the second memory device; and updating the read target data structure to identify that the replacement memory device and the second memory device are a pair of memory devices.

13. A non-transitory machine-readable medium storing instructions, for failure fault tolerance in a distributed memory system, the instructions, when executed by a memory processing unit connected across a host interface to a host and a memory fabric interface to a plurality of memory devices, cause the memory processing unit to perform operations comprising:

receiving, from the host across the host interface, a read request for a first memory location;

identifying that the first memory location is a mirrored memory location corresponding to a pair of memory devices comprising a first memory device and a second memory device;

determining a primary memory device as either the first or second memory device and a secondary memory device as the other of the first or second memory device;

transmitting the read request to the primary memory device over the memory fabric interface;

failing to receive data in the first memory location within a prespecified threshold period of time;

responsive to failing to receive the data in the first memory location within the prespecified threshold period of time, sending the read request to the secondary memory device over the memory fabric interface;

subsequently to sending the read request to the secondary memory device:

receiving, from the host across the host interface, a write request;

duplicating the write request to create a second write request; and transmitting the write request to the primary memory device over the memory fabric interface and the second write request to the secondary memory device over the memory fabric interface.

14. The non-transitory machine-readable medium of claim 13, wherein the operations of determining the primary memory device as either the first or second memory device comprises utilizing one or more bits in an address of the first memory location.

15. The non-transitory machine-readable medium of claim 13, wherein the operations further comprise:

setting a timer prior to transmitting the read request to the primary memory device, the timer less than the pre-specified threshold period of time;

receiving a timer expiry prior to receiving a response from the primary memory device; and responsive to receiving the timer expiry prior to receiving the response from the primary memory device, retransmitting the read request to the primary memory device over an alternative memory fabric link.

16. The non-transitory machine-readable medium of claim 15, wherein the operations further comprise:

setting a second timer prior to retransmitting the read request to the primary memory device over the alternative memory fabric link;

receiving a second timer expiry prior to receiving the response from the primary memory device over the alternative memory fabric link; and wherein the sending the read request to the secondary memory device over the memory fabric interface is performed responsive to receiving the second timer expiry prior to receiving the response from the primary memory device over the alternative memory fabric link.

17. The non-transitory machine-readable medium of claim 13, wherein the operations further comprise:

determining that the first memory device is to be replaced;

responsive to determining that the first memory device is to be replaced:

updating a read target data structure to identify that the first memory device is out of service;

updating a write target data structure to identify that the first memory device is out of service; and subsequent to updating the read target data structure and write target data structure, servicing subsequent read or write requests for addresses corresponding to the pair of memory devices using the second memory device only by sending read or write requests only to the second memory device.

* * * * *